W. S. BLAISDELL.
Bee Hive.
No. 229,362. Patented June 29, 1880.
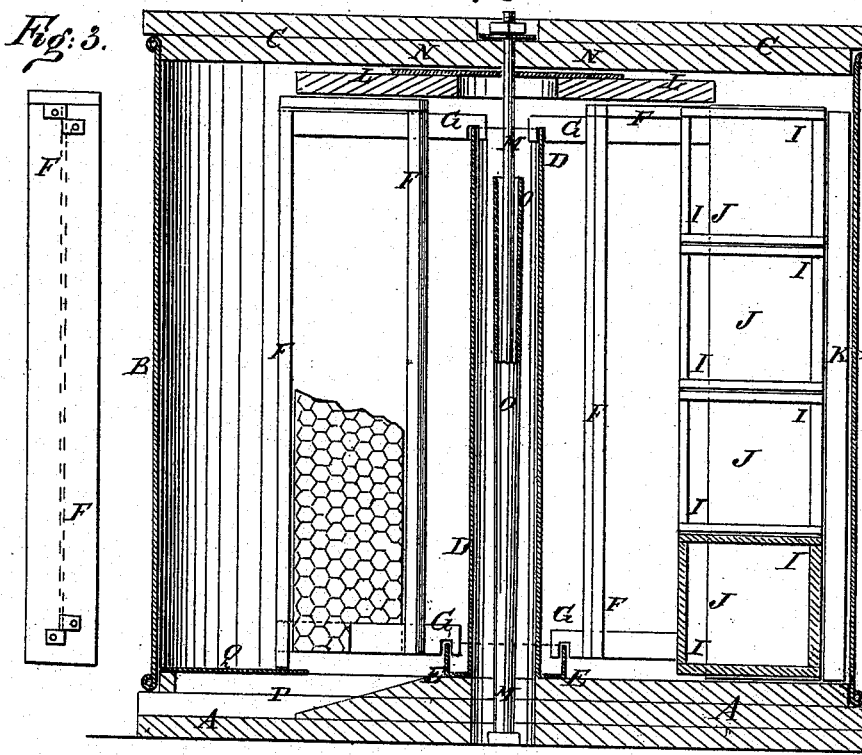
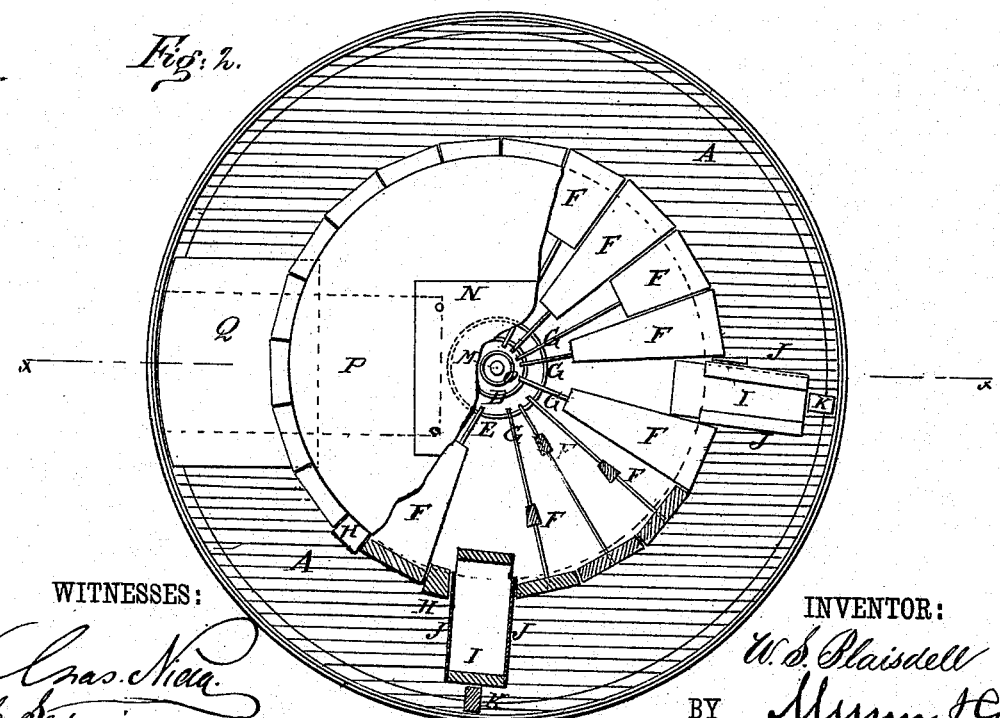
WITNESSES:
Chas. Nieta.
C. Sedgwick
INVENTOR:
W. S. Blaisdell
BY Munn & Co
ATTORNEYS.

United States Patent Office.

WILLIAM S. BLAISDELL, OF RANDOLPH, VERMONT.

BEE-HIVE.

SPECIFICATION forming part of Letters Patent No. 229,362, dated June 29, 1880.

Application filed October 9, 1879.

*To all whom it may concern:*

Be it known that I, WM. S. BLAISDELL, of Randolph, in the county of Orange and State of Vermont, have invented an Improved Bee-Hive, of which the following is a specification.

The object of the invention is to keep the bees at a uniform temperature, supply fresh air without a draft, give convenient space for surplus-honey frames, afford easy access to the bees, and protect their food. The means by which I accomplish these objects will first be described in connection with the drawings, and then pointed out in the claims.

In the drawings, Figure 1 is a sectional elevation; Fig. 2, a plan view, partly in section; Fig. 3, a view of a comb-frame in edge elevation.

A represents the base of the hive, rabbeted on the edge to receive the cylinder B, and C the top, rabbeted to fit upon the upper edge of the cylinder.

D is a hollow standard, fitted vertically over a central hole in the base and not extending quite to the top of hive, so as to admit a supply of fresh air.

E is a ring-cup to receive food or water in the winter for the use of the bees, whose cluster will be near the cup, and who are too torpid at this season to move far. It will not do to use this cup for food or water in the summer, because the nearness to the inlet would cause an obstruction to the workers.

F are the comb-frames for brooding. These are high, narrow, and in a circle about the standard D, to whose upper and lower inner corners are attached the hook-arms G. The lower ones hook upon the cup E and the upper upon the end of standard D.

The comb-frames F may be wedge-shaped and alternately wide and narrow, as shown in Fig. 2, and have bars H interposed between them, the latter to be replaced by surplus-honey frames I, which are small and placed one upon another to the height of the comb-frames.

J are plates extending from the outer side bars of the frames I nearly to the inner side bars, for the purpose of holding each series of the frames I in place.

Spaces are left between the plates J and the side bars of the frames I for the passage of the bees.

The surplus-honey frames are so arranged that their passages come between the outer side bars of the brood-frames F, in order that said passages may be covered by said side bars.

In order to use the surplus-honey frames I, they require to be moved slightly inward to bring the passage-spaces within the circle of the outer side bars of the comb-frames F, and thus allow the bees to enter and leave the honey-frames, and in this position they are held by bars K, as shown in Figs. 1 and 2.

The comb-frames F are held by a covering-plate, L, and the various parts of the hive by a vertical rod, M, connecting at the lower end with a cross-bar of the base, and at the upper end, after passing through top C and plates L N, by a suitable nut.

O is a food-receptacle, through which the rod M passes and to which it is rigidly attached. This is intended to contain food or water, being used for the former when a scarcity of food occurs between the crops of different flowers.

P is a bee-passage leading from the edge of base beneath the lower ends of the comb-frames F, and has that portion between the cylinder B and the outer side bars of the frames F held by a plate, Q.

The tube O is located out of the way of the bees in the working season, when they throng the inlets and outlets of the hive, but is easily accessible during the intervals between the raspberry, white clover, and bass-wood flowers. It is made sufficiently large to enable them to crawl down to and up from the liquid food which has been poured in from the top of hive.

What I claim as new and of my invention is—

1. The combination of the brood-frames F, hook-arms G, and hollow standard D, whereby the latter serves to ventilate the hive and support the comb-bars, as described.

2. The surplus-honey frames I, in combination with the comb-frames F, made alternately wide and narrow, as set forth.

3. The combination of the comb-frames F, the separating-bars H, and the honey-frames I, as and for the purpose specified.

4. The combination, with comb-frames F, of the superposed honey-frames I, arranged in a horizontal plane corresponding with that of the said comb-frames, and adapted to be moved inwardly to bring the passage-spaces within the circles of the outer side bars of the comb-frames, for the purpose described.

5. The cylinder O, arranged in the center of hive, made open at the upper end, and secured about the rod M, for the purpose set forth.

6. The feed-cup E, attached to cylinder D, and serving both as a food-receptacle and a catch for the latch-bars G, as shown and described.

7. The combination of the hollow standard D, open at top, the centrally-apertured plate L, and the detachable plate N, with the removable cover, for the purpose specified.

WILLIAM STEPHEN BLAISDELL.

Witnesses:
SAMUEL HOWARD,
C. A. HOWARD.